United States Patent [19]

Passey, Jr.

[11] 4,376,739
[45] Mar. 15, 1983

[54] HEATED AIR BLEED IDLE NEEDLE

[76] Inventor: John R. Passey, Jr., 425 Hecker Pass Rd., Watsonville, Calif. 95076

[21] Appl. No.: 345,561

[22] Filed: Feb. 4, 1982

[51] Int. Cl.³ .............................................. F02M 15/04
[52] U.S. Cl. .................. 261/142; 261/18 A; 261/DIG. 38; 219/207; 219/301; 123/25 B; 123/549
[58] Field of Search ............ 261/18 A, DIG. 38, 142; 219/207, 301; 123/25 B, 549

[56] References Cited

U.S. PATENT DOCUMENTS

| | | |
|---|---|---|
| 904,203 | 11/1908 | Hertzberg et al. .................. 219/207 |
| 2,022,453 | 11/1935 | Ball ..................................... 219/301 |
| 2,288,248 | 6/1942 | Long .................................... 219/301 |
| 2,397,988 | 4/1946 | Senninger ........................... 219/301 |
| 2,576,401 | 11/1951 | Kimmell . |
| 2,723,339 | 11/1955 | Kwartz . |
| 2,846,989 | 8/1958 | Eskew . |
| 2,962,269 | 11/1960 | Stanton ...................... 261/DIG. 38 |
| 3,077,341 | 2/1963 | Schlichting . |
| 3,091,282 | 5/1963 | Curzon ............................... 219/207 |
| 3,215,417 | 11/1965 | Whitmore et al. . |
| 3,557,763 | 6/1971 | Probst . |
| 3,865,907 | 2/1975 | Rock . |
| 3,875,922 | 4/1975 | Kirmss, Jr. . |
| 4,215,661 | 8/1980 | De Rossi ................... 261/DIG. 38 |

Primary Examiner—Tim R. Miles
Attorney, Agent, or Firm—C. E. Tripp

[57] ABSTRACT

An adjustable idle needle valve assembly for an internal combustion engine carburetor includes an air bleed threaded needle valve mounted on a plug for a tubular metal housing, an insulating fiberglass sleeve in the housing and an electric needle valve heater coil within the insulating sleeve. The heater coil extends between the needle valve mounting plug and an outer air inlet plug for the tubular metal housing. An air-conducting shield tube extends between the plugs for isolating the flow of bleed air from the insulating sleeve, particularly when the outer plug is connected to a liquid vapor trap.

11 Claims, 8 Drawing Figures

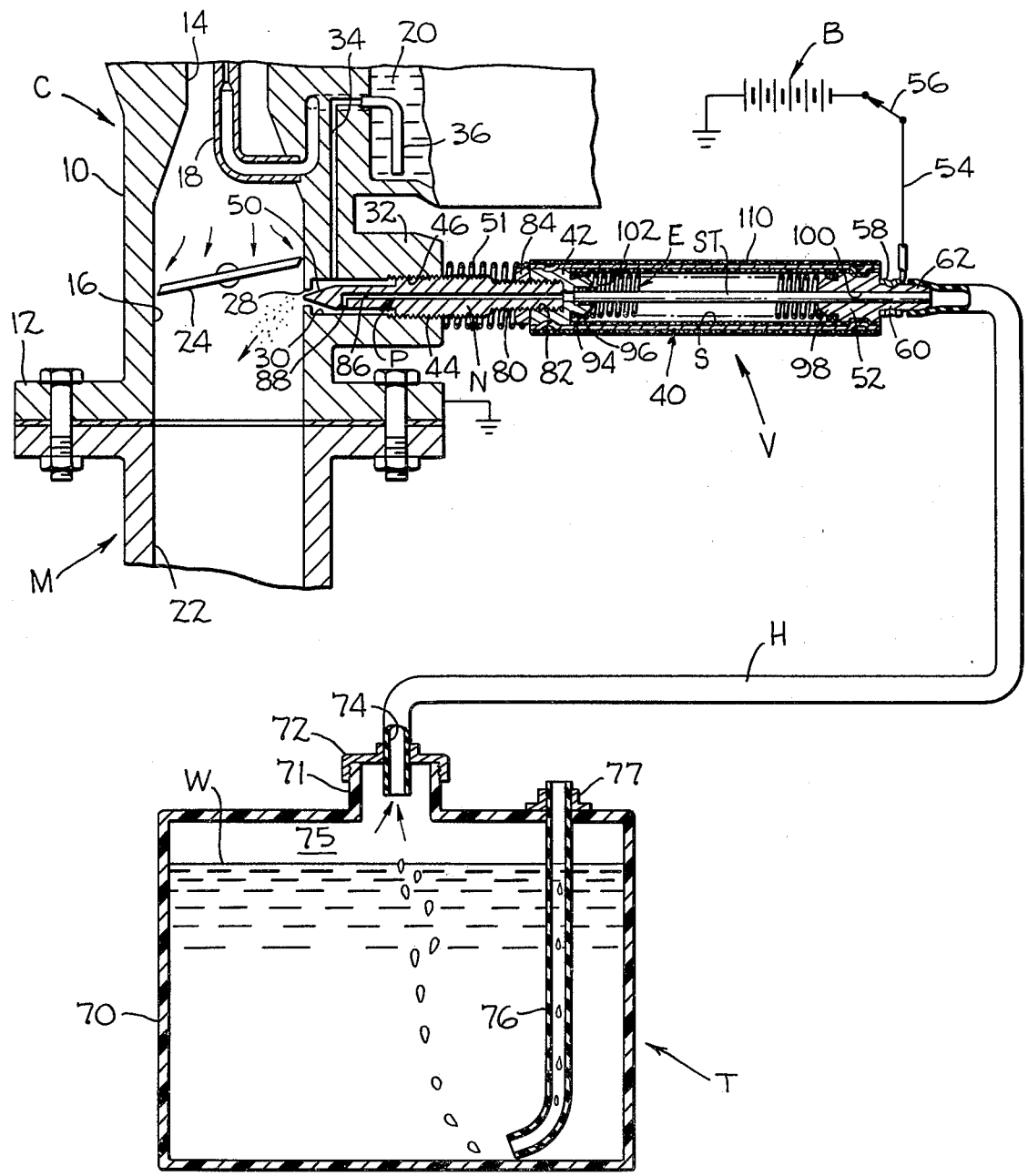
Fig_1

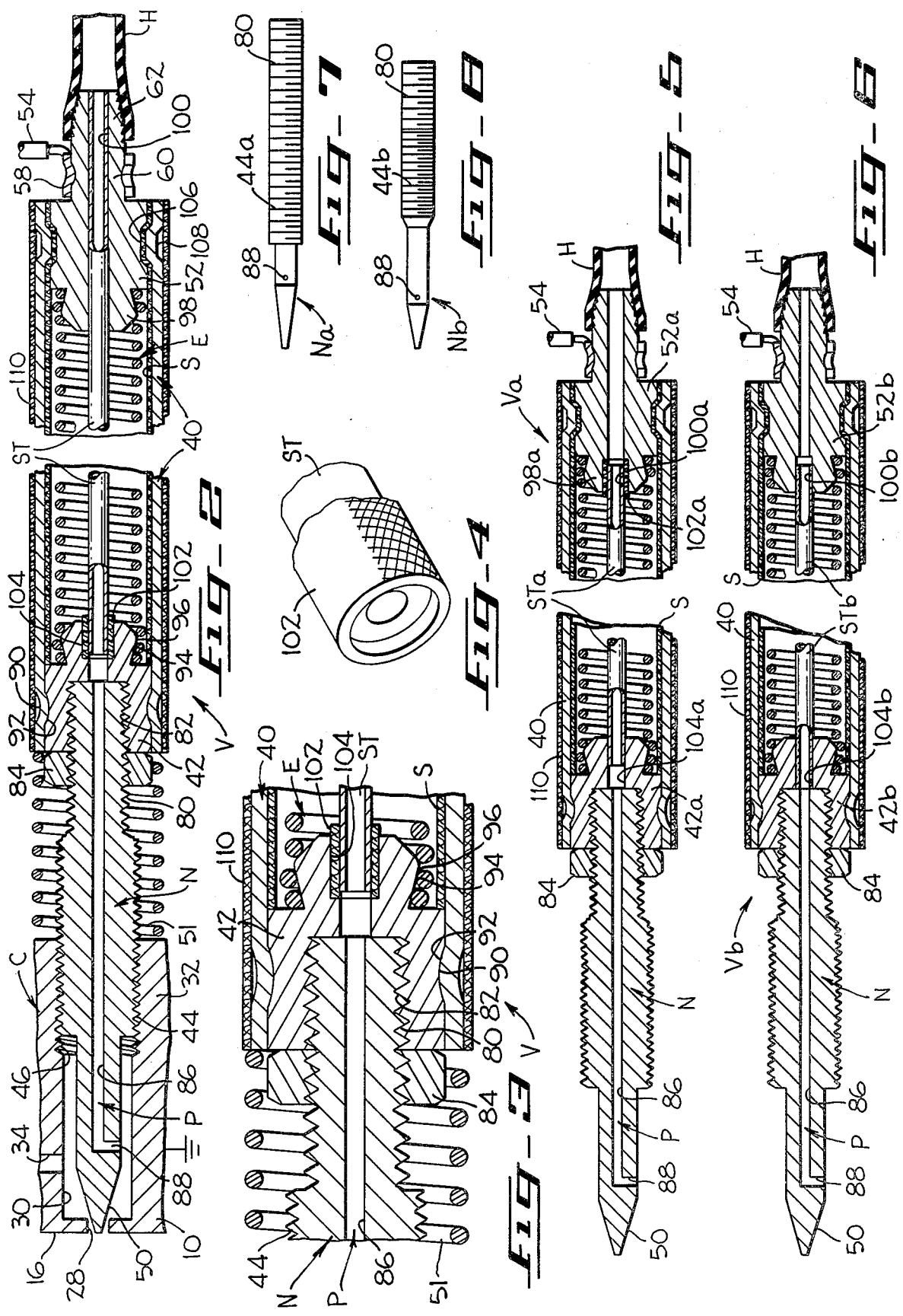

HEATED AIR BLEED IDLE NEEDLE

BACKGROUND OF THE INVENTION

1. Field of the Invention

This invention relates to gas and liquid contact apparatus and more particularly to a heated, air bleed idle jet needle for an internal combustion engine carburetor.

2. Description of Prior Art

Whitmore et al U.S. Pat. No. 3,215,417, Nov. 2, 1965, discloses a carburetor idle valve heater wherein the inner end of a tubular metal housing is connected to a solid idle needle valve and the housing contains an electric heating coil for the valve. A battery connection is made to a plug in the outer end of the housing.

Kimmell U.S. Pat. No. 2,576,401, Nov. 27, 1951 discloses an electric carburetor heater wherein fuel enters an outer container and passes through an enclosed percolating container. Energization of the starter motor circuit causes a resistor in the percolating container to boil fuel therein and eject the fuel through sidewall orifices of a closed end tube and thence into the main jet of the carburetor. A resistance wire is wound around the tube and the resistance coil remains energized after the engine is started until the temperature of the incoming fuel rises high enough to open a thermostat switch. A heat insulating shield surrounds the coil.

Kwartz U.S. Pat No. 2,723,339, Nov. 8, 1955, discloses a fuel activator for carburetors wherein gasoline from the carburetor bowl flows down into an electrically heated cup-shaped receptacle and then flows up through a tube into a fixed, main fuel discharge jet for the carburetor throat or mixing chamber.

Eskew U.S. Pat. No. 2,846,989, Aug. 12, 1958, discloses a carburetor de-icer wherein the carburetor needle valve has a bore that is connected to one end of a tube by a coupling nut incorporating a sealing ferrule. The other end of the tube admits heated air to an air heater box mounted on the exhaust manifold of the engine.

Schlichtling U.S. Pat. No. 3,077,341, Feb. 12, 1963, disloses an air bleed idle needle valve wherein an air bleed inlet check valve is opened by high vacuum with the throttle closed to lean the idle mixture. Another air inlet port is opened by a thermostatic valve during hot weather.

Probst U.S. Pat. No. 3,557,763, Jan. 26, 1971, discloses a system for inducting the vapor of a water-methanol solution into a port provided in the inlet manifold of an internal combustion engine, the port being for the connection of accessories. The vapor is drawn from a liquid vapor trap vessel having a metered air inlet tube.

Rock U.S. Pat. No. 3,865,907, Feb. 11, 1975, discloses a system for bleeding air into the idle needle valve during normal operation and for injecting air and water vapor from a water reservoir vapor trap through the idle needle valve during acceleration by a spring advanced, vacuum retracted piston.

Kirmss, Jr. U.S. Pat. No. ,3,275,922, Apr. 8, 1975, discloses a vapor injection system for channeling an octane increasing vapor from a liquid reservoir through a passage in the idle adjustment screw. The air inlet to the reservoir is metered by a needle valve.

SUMMARY OF THE INVENTION

The heated, air bleed needle valve assembly of the present invention is an improvement in heated idle needle valves of the type dislcosed in the aforesaid Whitmore et al U.S. Pat. No. 3,215,417.

An object of the present invention is to reduce exhaust emissions of pollutants such as carbon monoxide, hydro-carbons, etc. from an internal combustion engine and to decrease engine fuel consumption. These objects are accomplished by the installation of a heated idle needle valve which can be fitted to original equipment carburetors without modification of the carburetor and which can be adjusted after installation. Another object is to provide such a device which incorporates an air bleed passage and yet complies with both Federal and State emission standards or regulations relative to the escape of gasoline vapors from the carburetor to the atmosphere.

Experiments and engine testing with a commercial engine exhaust gas analyzer have shown that pollutant percentages in exhaust emissions can be reduced by substitution of an electrically heated idle jet needle, such as that shown in the aforesaid patent to Whitmore et al, for the original equipment needle. The Whitmore heated needle assembly is an elongate tubular device which can be substituted for the original equipment needle valve on most carburetors, even under the cramped and crowded conditions characteristic of modern engines. In the Whitmore et al device, an electric resistance wire heating coil element is disposed within a tubular metal housing element and both elements are conductively connected to the idle needle valve for the carburetor. The needle valve serves as an electrical ground for one end of the heating coil. The vehicle battery is connected to an insulated plug on the other end of the coil. A circuit is completed through the coil and the coil heats the needle valve both directly and by heat conduction from the surrounding metal housing. The needle valve conducts a heat to the adjacent zone of the carburetor throat structure.

Raw gasoline, normally aspirated for idling when the throttle is substantially closed, is vaporized by the heated needle valve, thereby reducing pollutant emissions. Heating the needle valve and the adjacent carburetor body by conduction facilitates engine starting, particularly at low ambient temperatures.

It is contemplated that pollutant emissions and fuel consumption could be further reduced by admitting a correctly metered flow of air through a metering or air bleed jet formed in the aforesaid heated idle needle valve. Experiments were conducted by boring an air bleed passage of selected diameter axially through the needle valve, which passage communicated with the atmosphere and with the carburetor throat at the idle jet port therein. When such an air bleed passage is provided in a heated needle valve and when the passage is of the proper size for the engine, not only are emissions further reduced, but the total percent reduction in emissions exceeds the reduction which could be expected from the simultaneous employment of needle heating and of air bleed techniques. These results were displayed by various comparative control tests of heated only, air bleed only, and heated air bleed idle needles, using a full size commercial "Sun" engine analyzer.

Although the addition of an air bleed passage to a heated idle needle valve, such as the needle valve of the aforesaid Whitmore et al patent, reduces pollutant admissions to an unexpected degree, the provision of an air bleed passage that is open to the atmosphere, could permit the escape of a very small volume of gasoline vapor when the engine is not running. In some jurisdictions, even this small fuel vapor escape could preclude official approval and certification of the device. Such fuel vapor escape could be prevented by connecting a liquid vapor trap to the air bleed inlet of an idle needle valve. However, the connection of a liquid vapor trap to an air bleed version of the Whitmore et al assembly does not provide an acceptable device.

Because of the interference, protrusion, overhang, etc., of carburetor and engine elements in the vicinity of the idle jet needle, the most accessible portion of a heated air-bleed needle assembly for selective connection of an air bleed inlet to a vapor trap is the outermost end portion of the assembly. This requires that the air inlet passage be provided in the outer plug that closes the outer end of the tubular housing, which plug must also be connected to the battery circuit. In the preferred assembly the outer plug is insulated from the tubular metallic housing to avoid short circuiting of the wire heating coil element through the housing and the grounded needle valve. The insulation extends along the inner wall of the housing to preclude electrical contact of the resistance wire core with the housing. The insulation must withstand the heat from the wire coil and the preferred installation is formed as a braided fabric sleeve of fiberglass filaments or fibers.

When bleed air is drawn through the outer plug of a heated air bleed needle valve assembly having insulation of the character described, minute particles of glass fiber can be detached from the fibers forming the insulation sleeve. The air bleed passage in the needle valve is a small diameter metering passage, e.g. 0.020"–0.030", and unless dislodged insulation particles are drawn completely through the passage, that passage will become plugged by insulation particles after a relatively short period of operation. This is particularly true when the air bleed inlet of the assembly is connected (as by a rubber hose) to the air or vapor chamber of a water vapor trap. Water vapor drawn through the needle valve assembly housing will wet dislodged insulation particles, thereby causing the particles to form a paste-like mass which collects in the needle valve air bleed passage and soon obstructs or plugs it.

In the heated, air-bleed needle valve assembly of the present invention, plugging of the needle valve air bleed passage by insulation particles or the like is prevented by a small diameter, air conducting shield tube connected between the outer, air inlet plug and an inner plug that connects to the threaded air bleed needle valve. Thus, even if particles of insulation are dislodged within the tubular housing, they cannot be drawn into the air bleed passage in the needle valve. Preferably, the shield tube is a thin walled metal tube having one end secured in one of the end plugs of the needle valve assembly by a light press fit. In order to insure that the electric heater coil provides the sole electrical connection between the outer and inner plugs of the assembly, the other end of the shield tube is electrically insulated from its associated plug. In the preferred embodiment of the invention, the aforesaid shield tube insulation is provided by fitting one end of the shield tube with a sleeve of insulating material which isolates the shield tube from the wall of the bore or socket formed in the associated plug for receiving the insulated end of the shield tube.

The heated air bleed idle needle valve assembly of the present invention is a universal device in that a single basic heated housing unit can selectively mount any one of an assortment of needle valves, custom designed for a selected carburetor. There are two basic variations in the specifications of various needle valves, the adjustment thread diameter pitch and the optimum diameter of the air bleed passage. In accordance with the present invention, an assortment of different individual needle valves is provided to meet different specifications but the outer end of each needle valve is formed with a single standardized thread, e.g. a 10/32 thread. The inner plug of the assembly body is counterbored and tapped to form a complementary, internally threaded socket. Thus, any selected needle valve of the assortment can be screwed to the outer plug of the assembly. The selected needle valve is secured by a locknut.

BRIEF DESCRIPTION OF THE DRAWINGS

FIG. 1 shows an installation of a heated air bleed needle valve assembly connected to a liquid vapor trap, with parts in section.

FIG. 2 is an enlarged section of the preferred needle valve assembly in the installation of FIG. 1.

FIG. 3 is a greatly enlarged fragmentary section of the carburetor end portion of the needle valve assembly.

FIG. 4 is an enlarged partial perspective of the insulated end of the shield tube.

FIG. 5 is a section like that of FIG. 2 showing a modified form of shield tube installation.

FIG. 6 is a section like that of FIG. 2 showing a modified form of shield tube. FIGS. 7 and 8 are views of modified threaded idle needles.

DESCRIPTION OF THE PREFERRED EMBODIMENT

FIG. 1 shows a preferred idle needle valve assembly of the present invention fitted to an internal combustion engine carburetor and connected to an air bleed vapor trap.

The down draft carburetor C is bolted to the intake manifold M of an internal combustion engine in the usual manner. Installed on the carburetor is a heated air bleed idle needle valve assembly V of the present invention. The air bleed inlet of the needle V (to be described in detail presently) is connected by a flexible hose H to a liquid vapor trap T for preventing release of gasoline vapors within the carburetor to the atmosphere.

CARBURETOR

The body 10 of the carburetor C is flanged at 12 for attachment to a flange on the intake manifold M in the usual manner. The carburetor has the usual air inlet venturi 14 in a fuel mixture delivery throat 16. A main jet 18 suppies fuel to the venturi 14 from the carburetor bowl 20 in a manner well known in the art. During operation, the flow of the mixture of fuel and air through the carburetor to an inlet port 22 in the inlet manifold is controlled by a throttle butterfly valve 24, in the usual manner.

The idle jet portion of the carburetor includes an idle jet orifice 28 opening into the throat 16 from an idle chamber 30 formed in a thickened carburetor body portion 32. The chamber 30 receives idling fuel from a passage 34 formed in the carburetor wall, which passage connects to a fuel delivery tube 36 extending into the carburetor bowl 20 in a conventional manner.

GENERAL DESCRIPTION OF NEEDLE VALVE ASSEMBLY

Referring to FIGS. 1 and 2, the major elements of the needle valve assembly V include a tubular metal housing 40 connected directly to an inner plug 42, which plug mounts the outer end portion of an air bleed idle needle N. The body of needle N is threaded at 44 and screwed into a complementarily threaded bore 46 in the carburetor wall portion 32. The inner end 50 of the needle N is conical to provide for manual adjustment of the effective size of the idle jet orifice 28 in the usual manner. A coil spring 51 maintains the adjustment. The needle N is formed with an air bleed passage P, to be described in detail presently.

In order to thoroughly vaporize the fuel drawn out of the idle jet orifice 28 during engine operation, the needle N is electrically heated by an electric resistance coil heating element E. The heating coil extends between the inner plug 42 and an outer plug 52 secured in the housing 40 and insulated therefrom by a sleeve S. The outer plug 52 has an air bleed passage formed therein, as will be described in detail presently.

Heating current is suplied to the resistance heating element E from the live terminal of the vehicle battery B (FIG. 1) via a line 54 controlled by a switch 56, which switch may operate in conjunction with the engine ignition switch (not shown). The line 54 has a connector clip 58 that connects to a nipple 60 (see FIG. 2) projecting from the outer plug 52. When the switch 56 is closed, the circuit is completed from the live post of battery B, through the line 54, the outer plug 52, the heating element E, the inner plug 42, the needle N, the wall 32 of the carburetor C and ground.

In order to prevent plugging of an air bleed passage P in the needle N and in accordance with the present invention, a shield tube ST extends between the inner and outer plugs 42,52 and isolates air bleed vapor passing through the needle valve assembly V from the interior of the tubular housing 40 and the insulating sleeve S. The importance of the shield tube ST during vapor trap operation will be explained in detail subsequently.

VAPOR TRAP

In some jurisdictions the small volume of fuel vapor that might escape from the air bleed passage P in the idle needle N, through the needle valve assembly V and to the atmosphere, represents an unacceptable emission. In these jurisdictions, a liquid vapor trap T is installed and is connected by the hose H to the needle valve assembly V.

The nipple 60 projecting from the outer plug 52 of the needle valve assembly is formed to provide a terminal hose nipple structure 62 (see FIG. 2) for receiving one end of the hose H leading from the vapor trap T.

The vapor trap T permits bleeding of the atmospheric air into the carburetor idle jet during engine operation while trapping any fuel vapor that might otherwise be emitted from the air bleed passage when the engine is not running. The vapor trap includes a water reservoir, preferably in the form of a plastic container or bottle 70 (FIG. 1). The bottle 70 has a threaded filler neck 71 that receives a closure cap 72. The cap is apertured at 74 for air tight connection to the associated end of the hose H in any suitable manner, such as by a friction fit, bonding, cementing, etc. The bottle 70 is partially filled with water W, leaving an upper air chamber 75.

In order to admit atmospheric air into the air chamber 75 in response to the partial vacuum developed in the carburetor 16 during engine operation, an air inlet tube 76 is provided. The upper end of this tube makes an air tight connection to a fitting 77 secured to the bottle 70 and the lower end of the tube extends to the bottom of the bottle.

When the engine is running and the hose H is connected to the needle valve assembly hose nipple 62, air and water vapor are drawn from the air chamber 75 of the bottle 70 through the hose H. These gases flow through the needle valve assembly V and into the carburetor throat 16. The resultant pressure drop in the air chamber 75 causes atmospheric air to flow as make-up air into the air inlet tube 76 and to bubble up through the body of water W in the reservoir. This action maintains the gas pressure in chamber 75 at substantially atmospheric pressure and provides a source of air for the chamber 75 during engine operation. However, any fuel vapors that find their way back from the carburetor throat 16 to the chamber 75 are trapped in the bottle 70 by the body of water W and will not be forced out of the tube 76 to the atmosphere.

Under circumstances wherein escape of fuel vapors to the atmosphere from the air bleed needle valve assembly V is not objectionable, no water trap T need be provided and no hose H is connected to the hose nipple 62 of the needle valve 70.

NEEDLE VALVE ASSEMBLY DETAILS

Referring to FIGS. 2 and 3, the needle N is threadedly attached to the inner plug 42 of the assembly V, in order that a specific needle may be selected from an assortment of needles designed for various carburetors and engines. As mentioned, the outer threaded portion 44 of the needle mates with the internal threads 46 formed at the carburetor idle chamber 30. The diameter and pitch of the outer threads 44 may vary from needle to needle, depending on the carburetor, but all needles have outer end attachment threads 80 of the same pitch and diameter. The inner plug 42 is counterbored and internally threaded at 82 to receive the needle attachment threads 80 and the needle is maintained in assembled condition with the plug 42 by a locknut 84.

As mentioned, the needle valve N is provided with an air bleed passage P. This passage is formed by drilling an axial bore 86 through the valve body and into the conical end 50. A radial bore 88 intersects the inner end of the axial bore 86. The diameters of one or both of the air bleed bores 86,88 are selected to minimize both fuel consumption and exhaust gas pollutant emissions. The latter may be measured by analyzer tests during engine operation.

The tubular housing 40 is preferably formed from a metal having a good coefficient of heat conduction such as aluminum or an aluminum alloy. As best seen in FIG. 3, the inner plug 42 is connected to the sleeve 40 by a crimping operation. The plug has a shallow groove 90 into which is crimped a bead 92 by deforming the wall of housing 40, with a conventional crimping tool. The resultant metal to metal joint facilitates conduction of heat absorbed by the housing 40 directly to the needle N and hence onto the wall portion 32 of the carburetor.

In order to mount the inner end of the heater element coil E, the inner plug 42 has a reduced diameter thimble 94 formed with a flared out surface 96 (FIG. 3). The inner end convolutions of the heater coil E are forced over the flared surface 96 of thimble 34 to make a snug electrical connection with the inner plug 42. This connection is made before the housing 40 and is slipped over and secured to the plug 42, as described above.

As seen in FIG. 2, the outer plug 52 also has a flared projecting thimble 98 that snugly receives the outer end convolutions of the heater coil E in the manner described in connection with FIG. 3.

In accordance with the preferred embodiment of the present invention, a metal shield tube ST extends between the end plugs 42,52 for conducting bleed air through the assembly V. As seen in FIG. 2, the outer plug 52 has an axial bore 100 that receives the outer end of the shield tube ST with a light press fit.

In order that the resistance coil element E will provide the sole electrical connection between the plugs 42,52, even though the shield tube ST is formed of metal, the inner end of the shield tube is electrically insulated from the inner plug 42. This insulation is provided by a short insulating sleeve 102 (FIGS. 3 and 4) that is slipped over the inner end of the shield tube in a pre-assembly operation and which snugly embraces the shield tube. The thimble 94 of the end plug 42 is counterbored at 104 (FIG. 3) to freely receive the insulating sleeve 102 during assembly. The inner end face of the insulated portion of the shield tube ST makes no contact with other parts and hence the shield tube does not provide an electrical short for the resistance coil element E.

In assembling the needle valve assembly V, one end of the heater coil E is forced over one of the plug thimbles and the insulation sleeve 102 on the shield tube ST is inserted in the counterbore 104 (FIG. 3) in the thimble 94 of the inner plug 42. The other end of the wire coil E is now forced over the outer plug thimble T. The outer insulation sleeve S is next slipped over and along the outer plug 52 until its inner end abuts the inner plug 42. The tubular metal housing 40 is slipped over the insulating sleeve S and the underlying outer plug 52, until the inner end of the housing surrounds the inner plug 42, as shown in the drawings. The previously mentioned crimping operation to form the crimp that secures the housing 40 directly to the inner plug 42 can now be performed.

As seen in FIG. 2, the outer plug 52 is formed with a shallow groove 106 like the groove 90 formed in the inner plug, but the outer insulating sleeve S surrounds the groove 106. Thus, when the tubular housing 40 is crimped at 108 by the crimping tool, the outer plug 52 is secured in the tubular housing 40 with a length of the insulating sleeve S trapped between the plug and the housing. The resultant insulation of the outer plug 52 from the housing 40, the insulation of the shield tube ST from the inner plug 42 and the disposition of the insulating sleeve S around the wire coil E all insure that the coil E will provide the sole electrical connection between the outer plug 52 and the inner plug 42 which mounts the electrically grounded needle valve N.

Before the assembled valve V is fitted to a carburetor, a sturdy tubular outer fabric sleeve 110 is snugly fitted over the tubular metal housing 40. The outer sleeve 106 facilitates manual rotation of the assembly V for adjustment of the needle N in the carburetor wall.

After the needle N has been threaded into the carburetor with the spring 51 surrounding the needle, the electrical connector 58 is slipped over the connector nipple 60 and if a vapor trap assembly T is to be employed, one end of the hose H is slipped over the hose nipple 62.

EXAMPLES

By way of the specific examples, the diameter of the axial bore 86 or of the radial bore 88 forming the air bleed passages in the needle N, will be approximately 0.56 mm (0.020 inches) for a typical four cylinder engine of about 2½ liter displacement. The corresponding diameters will be approximately 0.76 mm (0.030 inches) for an eight cylinder, five liter (305 cu. in.) engine. The shield tube ST has an external diameter of about 2.38 mm (3/32 inches) and a bore of about 1.59 mm (1/16 inches). The heater coil E is formed of nichrome wire of about 22 gauge or 0.635 mm (0.025 inches) diameter and has a resistance of about 4 ohms at 21° C. (70° F.) for 12 volts D.C. operation.

The insulating sleeves S and 102 are woven as tubes from fiberglass fibers, the tubes being commerically available under the trade name of Varflex, manufactured by the Varflex Company of Rome, N.Y.

The needle N, the end plugs 42,52, the housing 40 and the tube ST are formed of aluminum or of an aluminum alloy for good electrical and heat conduction.

OPERATION

When a needle valve assembly V of the present invention is originally installed, the original idle needle valve is replaced by a needle N of the present invention. This involves selecting and mounting a matching thread needle N on the inner plug 42. The selected needle N should have an air bleed passage P diameter suitable for the displacement of the engine, typical examples having been given previously. The connector wire lead 54 is hooked up to the vehicle wiring system as indicated in FIG. 1. If required by local regulations, a vapor trap assembly T including bottle 70 are mounted near the engine and the hose H is forced over the hose nipple 62.

The assembly V is adjusted with the engine running and with the heater coil E energized and at temperature. Optimum adjustment is obtained by the use of an engine exhaust gas analyzer and a tachometer, such as the analyzers manufactured by the Sun Electrical Corporation of Chicago, ILL.

With the throttle closed, the basic criteria for optimum adjustment are maximum engine speed without engine "rolling" and without fuel starvation and stalling. If an engine analyzer is available, other criteria are the minimizing of emissions such as $CO, NO_x$ and hydrocarbon gases. As previously mentioned, it has been found by analyzing the results of operational tests employing the heated air bleed needle valve assembly of the present invention and an exhaust gas analyzer, that the reduction in emissions attained by simultaneously employing both the needle heating technique and the air bleed passage technique is greater than the reduction in emissions attainable by the separate use of either technique. More significantly, if the emission reductions attainable individually by the two techniques separately are combined to provide a statistically correct theoretical combination reduction figure (the product of the individual figures), the aforesaid operational tests have shown that the emission reduction attained by applicant's double action needle assembly exceeds the reduction that would be theoretically provided if the aforesaid two techniques (heating and air bleed) were simultaneously employed.

If the water trap T is fitted, the gas drawn through the needle assembly V will contain water vapor. When no shield tube ST is provided, this gas dislodges particles from the insulating sleeve S. Any tendency of these dislodged particles to plug the air bleed passages P in the needle N is aggravated when the gas contains water vapor. The water vapor facilitates agglomeration of dislodged particles into a sort of paste, with the resultant plugging of the air bleed passage P.

By isolating the mixture of air and water vapor flowing through the needle valve assembly from the insulating sleeve S, the shield tube ST prevents the aforesaid entrainment of insulation member particles in the gases drawn through the air bleed passage P. Thus, the heated air bleed needle assembly V of the present invention will operate indefinitely without plugging, even though a liquid vapor trap T is employed. This result is not attainable if the shield tube ST is omitted. In fact, even if the needle valve assembly V is employed without the liquid vapor trap unit T, so that atmospheric air is drawn directly into the bore 100 in the shield tube, the shield tube ST insures that no particles of insulation material can accumulate in the needle air bleed passage P, even under highly humid atmospheric conditions.

MODIFIED FORMS

FIG. 5 is a longitudinal section like that of FIG. 2 showing a modified form of the invention. Since the only difference between the forms of FIG. 5 and that previously described relates to the assembly of the shield tube, the reference numerals employed for the elements of the embodiment of FIGS. 1-4 are applied without change to the corresponding elements in the embodiment of FIG. 5. However, where elements in the embodiment of FIG. 5 have been modified, the subscript "a" has been applied to corresponding reference characters.

In the needle valve assembly Va of FIG. 5 a metal shield tube STa is provided which serves the same function as the shield tube ST of the preferred embodiment, but in FIG. 5 the shield tube is insulated from the rear plug instead of from the front plug, as in FIG. 2. In the embodiment of FIG. 5 the bore 104a in the front plug 42a has a diameter that receives the shield tube STa with a light press fit. The bore 100a in the thimble 98a of the rear plug 52a has a diameter large enough to freely receive an insulating sleeve 102a that snugly embraces the rear end of the shield tube STa. Except for the physical transposition of the insulating sleeve from one end to the other end of the shield tube, the assembly steps and the mode of operation of the embodiment of FIG. 5 is like that described in connection with the preferred embodiment of FIGS. 1 ∝ 4.

FIG. 6 shows a similar modified form of the present invention wherein the shield tube is formed of a nonconducting, heat resistant material. In the heated air bleed needle valve assembly Vb of FIG. 6, as in the case of FIG. 5, the elements of the assembly which are modified are given the same reference characters as those previously applied but with the subscript "b" applied thereto.

In the form of FIG. 6 the shield tube STb is formed of a nonconducting, heat resistant material such as glass, sintered aluminum oxide or a heat resistant thermosetting resin. Neither end of the shield tube STb need be insulated from its associated end plug, so that the bores 104b in the front plug 42b and 100b in the rear plug 52b receive the associated ends of the shield tube directly without need for an insulating sleeve, as before. The shield tube STb of FIG. 6 has a nice sliding fit in the bores 104b, 100b and end stop shoulders are provided for axially locating the shield tube. The general principals of assembly and mode of operation of the form of the invention shown in FIG. 6 are like those previously described.

NEEDLE ASSORTMENT

The needle N (FIGS. 1-3) has mounting threads 80 of a standard diameter and pitch, eg 10/32. The carburetor threads 44 have a larger diameter and a finer pitch eg ¼"/36.

FIGS. 7 and 8 show two additional examples of assorted needles which are constructed to fit the carburetor for a given engine but each of which can be mounted on a signel master needle valve assembly V, Va, or Vb in accordance with the present invention. The needle Na of FIG. 7 is like the needle N previously described except that the diameter and pitch of threads 44a that are received by the body of the carburetor C are identical with the diameter and pitch of the standard mounting threads 80 that mount the needle in the inner plug. In other words, the needle Na of FIG. 7 is uniformly threaded along its length. In the embodiment illustrated the mounting threads 80 are size 10/32 for all needles.

The needle Nb of FIG. 8 has threads of uniform basic diameter along its length but in this needle the carburetor threads 44b are of a finer pitch (eg 10/40) than are the standard needle mounting threads 80 (10/32), previously described.

Having completed a detailed description of several embodiments of my invention so that those skilled in the art may practice the same, it can be seen that I have disclosed heated air-bleed needle valve assemblies which improve fuel economy, reduce exhaust emissions, can be selectively connected to a liquid fuel vapor trap, which will operate indefinitely without plugging of the air bleed passage running through the jet needle, and which can be fitted with any one of an assortment of threaded needle valves.

I claim:

1. An adjustable idle needle valve assembly for controlling the aspiration of idling fuel into the throat of an internal combustion engine carburetor at a zone downstream of the throttle valve, said assembly comprising a threaded metal needle valve, an elongate tubular metal housing, inner metallic plug means for said tubular housing connected to the outer end of said needle valve, outer metallic plug means for said housing, means for insulating one of said plug means from the housing, a tubular electric insulating sleeve within said housing, a helical heating coil of resistance wire within said insulating sleeve connected between said outer and inner plug means, and means for providing an electrical connection to said outer plug means for energizing said coil; the improvement wherein said needle valve has an air bleed passage extending axially from its outer end to a transverse passage at its inner end, an axial air passage in said inner plug means communicating with said needle valve passage, an air inlet passage in said outer plug means, an air conducting shield tube extending between said outer and inner plug means and communicating with the air passages therein, said coil of resistance wire providing the sole electrical connection between said outer and inner plug means, and an air line connection on said outer plug means for selectively connecting said plug means to an air inlet vapor trap.

2. The needle valve assembly of claim 1; wherein said shield tube is formed of metal and means for electrically insulating one end of said shield tube from one of said plug means.

3. The needle valve assembly of claim 2; wherein the other end of said shield tube is mounted directly to the other of plug means.

4. The needle valve assembly of claim 2; wherein the air passage in said one plug has a portion that is larger in diameter than the diameter of said one end of the shield tube, said shield tube insulating means comprising an insulating sleeve surrounding said one end of the shield tube and disposed in said larger diameter portion of the inner plug means passage.

5. The needle valve assembly of claim 4; wherein said shield tube insulating sleeve is a fiber glass fabric.

6. The needle valve assembly of claim 4; wherein said shield tube is mounted directly in the air passage of said outer plug means with a light press fit.

7. The needle valve assembly of claim 1; comprising a liquid reservoir air inlet vapor trap and air conduit means detachably connected between said vapor trap and the air line connection on said outer plug means.

8. The needle valve assembly of claim 7; wherein said electrical connection means comprises a connector clip detachably connected to said outer plug means between said air line connection and said housing.

9. The needle valve assembly of claim 1; wherein the inner portion of said inner plug means is formed with a threaded socket communicating with the air passage in said inner plug means, the outer end of said needle valve being externally threaded and screwed into said socket for facilitating attachment of any one of an assortment of needle valves to said inner plug means and a locknut for the external threads on the outer end of said needle valve.

10. An adjustable idle needle valve assembly for the carburetor of an internal combustion engine, said assembly being of the type having a threaded needle valve with an air bleed passage therethrough, an electric heater unit comprising a tubular housing, inner plug means for connecting the inner end of said housing to the outer end of said needle valve, electric terminal plug means for the outer end of the housing, means for insulating one of said plug means from the housing, a helical electric heating coil within said housing connected between said plug means for heating said needle valve, an electric insulation sleeve surrounding said coil, an air bleed passage through each of said plug means and a hose nipple on said electric terminal plug means; the improvement comprising a small diameter metallic air conducting shield tube, means for mounting said shield tube between said plug means and in communication with said air bleed passages, means for electrically insulating said shield tube from one of said plug means to prevent shorting out of said heating coil by said shield tube and means for selectively connecting the hose nipple on said electric terminal plug means to a vapor trap.

11. The assembly of claim 10; wherein said shield tube insulating means comprises an insulating sleeve disposed between an end of the shield tube and the associated plug means.

* * * * *